United States Patent
Höglund (10) Patent No.: US 12,127,159 B2
(45) Date of Patent: Oct. 22, 2024

(54) TECHNIQUE FOR IDLE MODE PAGING IN A RADIO COMMUNICATION BETWEEN A NETWORK NODE AND A RADIO DEVICE

(71) Applicant: Telefonaktiebolaget LM Ericsson (publ), Stockholm (SE)

(72) Inventor: Andreas Höglund, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 621 days.

(21) Appl. No.: 16/638,159

(22) PCT Filed: Aug. 3, 2018

(86) PCT No.: PCT/EP2018/071167
§ 371 (c)(1),
(2) Date: Feb. 11, 2020

(87) PCT Pub. No.: WO2019/030143
PCT Pub. Date: Feb. 14, 2019

(65) Prior Publication Data
US 2020/0169982 A1    May 28, 2020

Related U.S. Application Data

(60) Provisional application No. 62/544,082, filed on Aug. 11, 2017.

(51) Int. Cl.
*H04W 76/28* (2018.01)
*H04W 52/02* (2009.01)
*H04W 68/00* (2009.01)

(52) U.S. Cl.
CPC ..... *H04W 68/005* (2013.01); *H04W 52/0216* (2013.01); *H04W 52/0219* (2013.01); *H04W 52/0235* (2013.01); *H04W 76/28* (2018.02)

(58) Field of Classification Search
CPC ......... H04W 52/0216; H04W 52/0219; H04W 52/0235; H04W 68/005; H04W 68/025; H04W 76/27; H04W 76/28
See application file for complete search history.

(56) References Cited

U.S. PATENT DOCUMENTS

2011/0292856 A1* 12/2011 Park ................... H04L 5/001
370/329
2016/0014716 A1* 1/2016 Tabet ................. H04W 68/005
455/458

(Continued)

FOREIGN PATENT DOCUMENTS

EP         2453710 A1    5/2012
WO      2017079574 A1    5/2017

OTHER PUBLICATIONS

Unknown, Author, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.11.0, Jun. 2019, pp. 1-783.

(Continued)

*Primary Examiner* — Lester G Kincaid
*Assistant Examiner* — Dung L Lam
(74) *Attorney, Agent, or Firm* — Murphy, Bilak & Homiller, PLLC (57) ABSTRACT

A technique for idle mode paging in a radio communication between a network node and a radio device is described. More specifically, and without limitation, methods and devices are provided for sending and receiving a power control signal (702) in a radio communication between a network node (100; 500) and a radio device (200; 600). According to a general aspect, the power control signal (702) for notifying a radio device which is being paged includes an indicator (704) that, according to a scheme (706;

(Continued)

708), uniquely identifies a subgroup of one or more radio devices comprising at least the radio device that is being paged within a group (710) of radio devices (600) sharing at least the same paging frame.

24 Claims, 6 Drawing Sheets

(56) References Cited

U.S. PATENT DOCUMENTS

2017/0215169 A1* 7/2017 Lee .................... H04W 4/70
2017/0367069 A1* 12/2017 Agiwal ................ H04B 7/088
2018/0317198 A1* 11/2018 Lee .................. H04W 68/005

OTHER PUBLICATIONS

Unknown, Author, "3rd Generation Partnership Project; Technical Specification Group Radio Access Network; Evolved Universal Terrestrial Radio Access (E-UTRA); User Equipment (UE) procedures in idle mode (Release 14) The", 3GPP TS 36.304 V14.3.0, Jun. 2017, pp. 1-49.

Unknown, Author, "Power consumption reduction for paging and connected-mode DRX for NB-IoT", 3GPP TSG-RAN WG1 #89; R1-1706887; Hangzhou, P.R. China, May 15-19, 2017, pp. 1-5.

Unknown, Author, "UE power consumption reduction by new physical signal/channel in MTC", 3GPP TSG RAN WG1 Meeting #89; R1-1707568; Hangzhou, P.R. China, May 15-19, 2017, pp. 1-6.

* cited by examiner

TECHNIQUE FOR IDLE MODE PAGING IN A RADIO COMMUNICATION BETWEEN A NETWORK NODE AND A RADIO DEVICE

TECHNICAL FIELD

The present disclosure generally relates to a technique for idle mode paging in a radio communication between a network node and a radio device. More specifically, and without limitation, methods and devices are provided for sending and receiving a power control signal in a radio communication between a network node and a radio device according to a discontinuous reception cycle.

BACKGROUND

Efforts have been made to design an improved 5th generation (5G) communication system or architecture, inter alia, by specifying technologies to cover Machine-to-Machine (M2M) and/or Internet of Things (IoT) related use cases. Most recent work for the 3rd Generation Partnership Project (3GPP) Release 13 and 14 includes enhancements to support Machine-Type Communications (MTC) with new UE categories, i.e. Cat-M1 and Cat-M2, supporting reduced bandwidth of six physical resource blocks (PRBs), e.g. up to 24 PRBs for Cat-M2, and Narrowband IoT (NB-IoT) user equipments (UEs) providing a new radio interface and UE categories, i.e. Cat-NB1 and Cat-NB2.

In this document, the LTE enhancements introduced in 3GPP Release 13, 14 and 15 for MTC will be referred to as "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between "legacy" LTE and the procedures and channels defined for eMTC and for NB-IoT. Some important differences include new physical channels, such as the physical downlink control channels (PDCCHs), called MTC physical downlink control channel (MPDCCH) in eMTC and narrowband physical downlink control channel (NPDCCH) in NB-IoT, and a new physical random access channel, NPRACH, for NB-IoT. In Release 15, according to a common work items (WI) objective in the approved work items (WI) for both NB-IoT and Rel-15 enhancements for eMTC, there is a need to work on the power consumption reduction for physical channels. In particular, for idle mode paging and/or connected mode DRX, there is a need for a physical signal/channel that can be efficiently decoded or detected prior to decoding the physical downlink control/data channel for eMTC or the NPDCCH/narrowband physical downlink shared channel (NPDSCH) for NB-IoT.

Figure 9:
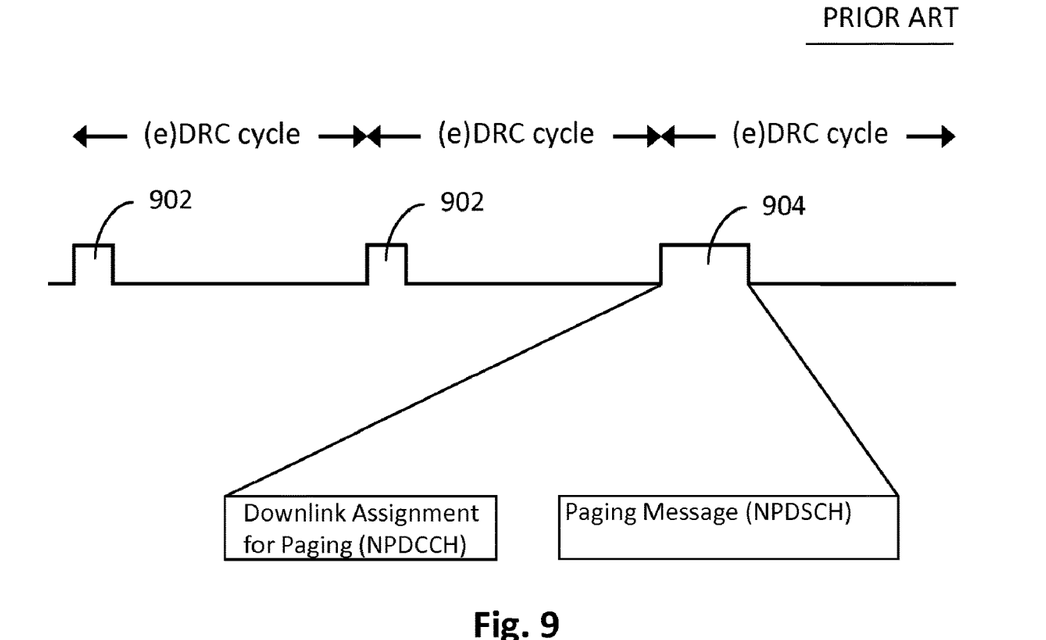
FIG. 9 illustrates an example of UE idle mode operation of a device for monitoring paging as known in the art.

This is illustrated in FIG. 9 that illustrates the UE idle mode operation for monitoring paging. Paging is used for network-initiated connection setup when the device is in RRC_IDLE. In LTE, the same mechanism as for "normal" downlink data transmission on the DL-SCH is used and the mobile device monitors the L1/L2 control signaling for downlink scheduling assignments related to paging. Therefore, a discontinuous reception (DRX), cycle (paging cycle) is defined, allowing the device to sleep most of the time and only briefly wake up to monitor the L1/L2 control signaling. The network configures in which frame (paging frame (PF)) and subframes (paging occasions (POs)) a device should wake up and listen for paging.

According to the technical specification 3GPP TS 36.304 V14.3.0, the UE may use DRX in idle mode in order to reduce power consumption. One PO is a subframe where there may be P-RNTI transmitted on PDCCH or MPDCCH or, for NB-IoT on NPDCCH addressing the paging message. In P-RNTI transmitted on MPDCCH case, PO refers to the starting subframe of MPDCCH repetitions. In case of P-RNTI transmitted on NPDCCH, PO refers to the starting subframe of NPDCCH repetitions unless subframe determined by PO is not a valid NB-IoT downlink subframe then the first valid NB-IoT downlink subframe after PO is the starting subframe of the NPDCCH repetitions.

One PF is one Radio Frame, which may contain one or multiple PO(s). When DRX is used the UE needs only to monitor one PO per DRX cycle. One Paging Narrowband (PNB) is one narrowband, on which the UE performs the paging message reception.

As illustrated in FIG. 9, in every paging cycle (DRC cycle or eDRC cycle), the UE wakes up in its designated time window to check whether there is a paging message. A paging cycle may be configured as DRX or eDRX cycle. The maximum DRX and eDRX cycles may be 10.24 seconds and two hours, 54 minutes and 46 seconds, respectively. A paging message may be carried in a physical downlink shared channel (PDSCH), e.g. the NPDSCH and scheduled by downlink control information (DCI) format N2 carried in NPDCCH. Multiplexing paging records for multiple UEs within one paging message may be supported. For UEs in extreme coverage limited situations, up to 2048 repetitions may be used for transmitting a DCI. Thus, a UE may need to receive as many as 2048 subframes to determine whether there is a paging message sent on the associated NPDSCH (starting 4 NB-IoT subframes from the end of last NPDCCH subframe). In most cases however, there may be no DCI format N2 sent at all during an (e)DRX cycle. The reference numeral 902 indicates that the UE wakes up to monitor the NPDCCH attempting to decode the DCI format N2. Only after the third wake-up procedure 904 of the UE in the example of FIG. 9, there is actually a paging message. Thus from power efficiency point of view, the UE may in many cases stay awake for unnecessarily long time attempting to decode DCI format N2.

Therefore, as a possible solution for UE power consumption reduction, it has been proposed to use a wake-up signal or a go-to-sleep signal in order to indicate before the first subframe of the NPDCCH search space, whether there will be any paging record sent during an (e)DRX cycle.

The 'wake-up signal' and 'go-to-sleep signal' solutions are based on the transmission of a short signal which would indicate to the radio device whether or not it would have to continue to decode the full MPDCCH (eMTC) or NPDCCH (NB-IoT). The decoding time for the former signal is considerably shorter than full MPDCCH or NPDCCH which gives a reduced UE power consumption and longer battery life. The wake-up signal would be transmitted only when there is paging for the UE; if there is not, the wake-up signal will not be transmitted (the meaning of DTX in the above agreement) and the UE would go back to sleep. The go-to-sleep signal' would be transmitted only when there is not any paging for the UE; if there is, the go-to-sleep signal will not be transmitted (the meaning of DTX in the above agreement) and the UE would continue to decode NPDCCH or MPDCCH.

Figure 10:
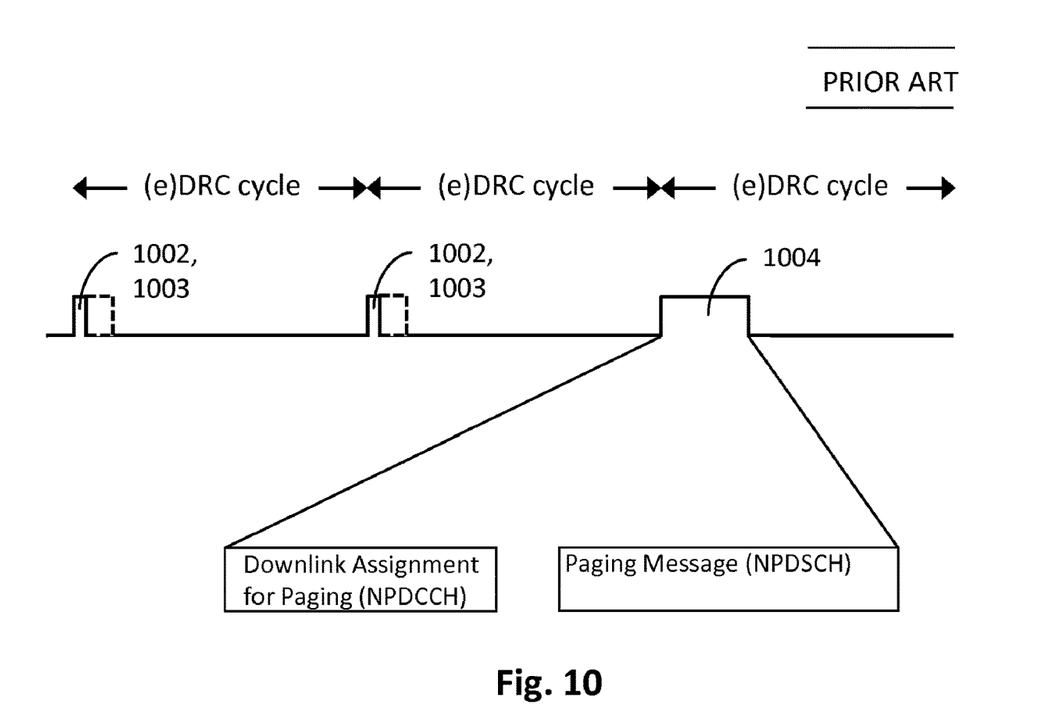
FIG. 10 illustrates an example of UE idle mode operation of a device for monitoring paging based on a power control signal as known in the art.

The 'wake-up signal' and 'go-to-sleep signal' solutions are illustrated in FIG. 10.

In the wake-up signal scenario, as mentioned above, the wake-up signal is used to indicate that there will be one or more paging records sent during the (e)DRX cycle that follows. Upon receiving such a signal, the UE needs to stay up to attempt to decode the DCI format N2 carried in NPDCCH. This case is illustrated by the UE idle mode operation 1004. However, if the power control signal is not present, the UE will return to sleep mode. This case is illustrated by the UE idle mode operation 1002.

In the go-to-sleep scenario, the go-to-sleep signal is used to indicate that there will be no paging record sent during the (e)DRX cycle that follows. Upon receiving such a signal, the UE goes back to the sleep mode. This case can also be illustrated by the UE idle mode operation 1002 in FIG. 10. However, if the "go-to-sleep" signal is not detected, the UE has to stay up to attempt to decode the DCI format N2 carried in NPDCCH. This case is illustrated again by the UE idle mode operation 1004.

The wake-up signal and the go-to-sleep signal may therefore be regarded as power control signals.

As illustrated in FIG. 10, the decoding time for such as wake-up or go-to-sleep signal, which may be a single bit physical signal, as illustrated by the reference numeral 1002 in FIG. 10, is considerably shorter than the time required for decoding the full MPDCCH or NPDCCH, as shown in FIG. 9 as well as in FIG. 10 using the dotted line. Using a wake-up signal or a got-to-sleep signal therefore enables a reduced UE power consumption and longer battery life of the UE, especially for UEs in extreme coverage limited situations.

One problem with such a wake-up signal is the risk for false paging. All UEs sharing a PF and PO will share the same wake-up signal or go-to-sleep signal. That is, if a larger number of UEs share the PF (and PO) but there is only paging of one UE, the eNodeB (eNB) will transmit the wake-up signal and all these UEs will read it and continue to decode the corresponding PDCCH, e.g. the NPDCCH or MPDCCH, which holds the DCI out the (N)PDSCH transmission holding the paging message. That is, these UEs will unnecessarily read the paging message although it does not concern them and they are not being paged. This problem is called false paging.

SUMMARY

Accordingly, there is a need for a technique for idle mode paging in a radio communication between a network node and a radio device enabling a reduced power consumption for physical channels. Alternatively or in addition, there is need for a technique for an improved power control signaling method to enable a more power efficient idle mode paging while avoiding or at least reducing false paging.

According to a first general aspect, there is provided a method of idle mode paging in a radio communication between a network node and a radio device. According to an aspect, the method may be a method of sending, by a network node, a power control signal according to a discontinuous reception, DRX, cycle or paging cycle in a radio communication between a network node and a radio device.

The method comprises or triggers a step of sending the power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same paging frame. In other words, it is proposed to add some bits of information to the power control signal to be able to differentiate which radio device, e.g. UE, in the shared PF is currently being paged to avoid or at least reduce false paging.

This is advantageous in particular if a larger number of UEs share the PF but there is only paging of one radio device. The indicator added to the power control signal uniquely identifies a subgroup of radio devices out of all radio devices sharing at least the same PF, wherein the subgroup comprises the radio device that is currently being paged to reduce false paging. Accordingly, not all radio devices, e.g. UEs, sharing the same PF will have to read and continue to decode the corresponding PDCCH, e.g. the NPDCCH or MPDCCH, which holds the DCI pointing out the (N)PDSCH transmission holding the paging message, but only the radio devices belonging to the subgroup of radio devices that has been identified by the indicator. As a result, UE power consumption is reduced and battery life improved.

Embodiments of the method according to the first general aspect may include one or more of the following aspects and/or features.

The subgroup may comprise only the radio device that is being paged. In any case, the subgroup comprises a subset of all radio devices sharing at least the same PF. The situation where the subgroup in addition to the radio device that is currently being paged comprises further but not all remaining radio devices sharing at least the same PF may be beneficial in situations where there is a large number of radio devices sharing a PF and the International Mobile Subscriber Identity (IMSI) value of the device does not allow to efficiently differentiate between all radio devices within a PF based on a identifier of a certain length.

According to an aspect, the indicator may, according to the scheme, uniquely identify a subgroup of one or more radio devices comprising at least the radio device that is being paged within a group of radio devices sharing the same paging frame (PF) and the same paging occasion (PO).

As used herein, the term "sharing the same paging frame" may indicate or specify all radio devices configured to monitor the same PF within the DRX cycle/paging cycle. In a similar manner, the term "sharing the same paging occasion" may indicate or specify all radio devices configured to monitor the same paging subframe (PO) within the PF.

Preferably, the indicator, according to the scheme, may uniquely identify the radio device which is being paged only within a group of radio devices sharing the same paging frame or only within a group of radio devices sharing the same paging frame and the same paging occasion. According to this aspect, the indicator, according to the scheme, may not uniquely identify radio devices being configured to monitor different paging frames or to monitor different paging occasions. According to this aspect, the number of required bits to be added as the identifier to the power control signal can be reduced.

The indicator may comprise bits of information that are derived in accordance with the scheme or based on the scheme to be able to differentiate which radio device in the shared PF or at least which subgroup is currently being paged to avoid or at least reduce false paging.

According to an aspect, the indicator may comprise bits of information that are derived in accordance with the scheme from the identity of the radio device that is currently being paged and which should be notified with the power control signal and from the DRX parameters provided in System Information.

In other words, it is proposed to add some bits of information to the power control signal to be able to differentiate which radio device in the shared PF and/or shared PO is currently being paged to avoid or at least reduce false paging.

The scheme may thus be a formula to determine the identifier. The identifier may thus be calculated according to the scheme by the network node and verified by a radio device receiving the power control signal according to the same scheme.

The power control signal may be a physical signal, i.e. a signal sent over a physical channel, e.g. a physical downlink control channel. By way of example, the physical downlink control channel is a MPDCCH in eMTC or a NPDCCH in NB-IoT. Thus, the power control signal may be a physical downlink control channel signal, e.g. a MTC physical downlink control channel, MPDCCH, signal or a narrowband physical downlink control channel, NPDCCH, signal.

According to another aspect, the indicator may be provided as a binary sequence (bit stream, sequence of bits). The indicator may be derived, according to the scheme, from a radio device identity (UE_ID) used for paging the radio device. The UE_ID used for paging is computed based on the International Mobile Subscriber Identity (IMSI) value of the radio device, e.g. UE_ID=IMSI mod 1024*x, x being 1, 4, or 16.

The indicator may comprise the most significant bit (msb) of the bit sequence representing the decimal integer value of UE_ID and does not comprise the least significant bit (lsb) of the bit sequence representing the decimal integer value of UE_ID. Accordingly, according to this aspect, the bit sequence representing the indicator is shorter than the bit sequence representing the UE_ID of the radio device that is currently being paged. The most significant bit is the bit in a binary sequence that carries the greatest numerical value.

According to a further aspect, the indicator may be determined according to the scheme based on the International Mobile Subscriber Identity, IMSI, the number of PFs within the radio device DRX cycle, and the number of POs (sub-frames) used within a PF. The resulting value may be represented as a binary sequence in the power control signal. Based on these parameters, the radio devices sharing the same Pf and PO may be determined and differentiated.

According to a further aspect, the indicator may be determined according to the scheme by the formula 1:

$$\text{indicator} = \text{floor} (UE\_ID/(N*Ns)), \quad \text{(Formula 1):}$$

wherein floor ( ) is a floor function, UE_ID is the radio device identity used for paging, that is computed based on the IMSI, N is the number of PFs within the radio device DRX cycle, and Ns is the number of POs used within a PF.

The resulting decimal integer value of floor (UE_ID/(N*Ns)) may be converted in a corresponding binary sequence to represent the indicator in the physical power control signal.

Formula 1 assigns different indicator values for a group of radio devices (UEs) sharing the same PF and the same PO(s), so that the radio device within this group that is currently being paged can be uniquely identified or alternatively, at least a subgroup of radio devices comprising the radio device that is currently being paged can be uniquely identified.

According to yet another aspect, the indicator may be determined according to the scheme based on the International IMSI, the number of PFs within the radio device DRX cycle, the number of POs used within a PF, and based on the number of paging narrowbands or paging carriers provided in System Information. The resulting value may be represented as a binary sequence in the power control signal.

Based on these parameters, the radio devices sharing the same PF and POs but that are monitoring paging on possibly a different carrier or narrowband may be determined and differentiated efficiently.

According to a further aspect, the indicator may be determined according to the scheme by to the formula 2:

$$\text{indicator} = \text{floor} (\text{floor} (UE\_ID/(N*Ns))/Nn), \quad \text{(Formula 2):}$$

wherein floor ( ) is a floor function, UE_ID is the radio device identity, N is the number of PFs within the radio device DRX cycle, Ns is the number of POs used within a paging frame and, and Nn is the number of paging narrowbands or paging carriers.

The resulting decimal integer value of floor (floor (UE_ID/(N*Ns))/Nn) may be converted in a corresponding binary sequence to represent the indicator in the physical power control signal.

Determining the indicator according to a scheme defined by Formula 2 is beneficial in situations where multiple narrowbands are used. In this case it is sufficient to differentiate in the power control signal those radio devices that share both PF and paging narrowband (PNB). In this case, Nn in Formula 2 corresponds to the number of paging narrowbands for P-RNTI monitored on MPDCCH. For NB-IoT, the principle is exactly the same. In this case, Nn represents the number of paging carriers (for P-RNTI monitored on NPDCCH) provided in System Information.

The parameters/value used in Formula 1 and Formula 2 are determined, according to the technical specification 3GPP TS 36.304, section 7.1, as follows:

UE_ID is determined as IMSI mod X*1024, X being one of 1, 2, 4, and 16,

N=min(T, nB), wherein "T" is radio device DRX cycle length in radio frames, and, "nB" is one of 4T, 2T, 1T, ½T, ¼T, ⅛T, 1/16T, 1/32T, 1/64T, 1/128T, 1/256T, T/512, and T/1024.

Ns: max (1, nB/T);

Nn: number of paging narrowbands (for P-RNTI monitored on MPDCCH) or paging carriers (for P-RNTI monitored on NPDCCH) provided in System Information). P-RNTI is the abbreviation for Paging-RNTI or Paging Radio-network temporary identifier.

The method according to the first general aspect may further comprise the step of determining if there is a paging message for the radio device during a subsequent DRX cycle, and if so, preferably if and if only so, sending the power control signal for said radio device prior to sending the downlink assignment for paging said radio device using the PDCCH, and prior to sending the paging message for said radio device using the PDSCH. Thus, the power to control signal would be transmitted only when there is paging for the radio device; if there is not, the power control signal will not be transmitted.

By way of example only, the PDCCH may be a Narrowband PDCCH, also referred to as NPDCCH or a Machine-type communication, MTC, PDCCH, also referred to as MPDCCH.

According to a further aspect, the method may further comprise the step of: responsive to determining that there is no paging message for said radio device during a subsequent DRX cycle, no power control signal is sent for said radio device. According to this aspect, the power control signal may be a wake-up signal, since the wake-up signal would be sent (transmitted) only when there is paging for the radio device (UE); if there is not, the wake-up signal will not be transmitted (the meaning of DTX in the above agreement) and the radio device would go back to sleep. The power control/wake-up signal is used to indicate that there will be one or more paging records sent during the (e)DRX cycle that follows. Upon receiving such a signal, the radio device needs to stay up to attempt to decode the DCI format N2 carried in PDCCH used for paging.

Thus, the power control signal could be used as a wake-up signal comprising the indicator so that false paging is avoided or at least reduce compared to a wake-up signal comprising no such indicator.

Alternatively, according to another aspect, the power control signal could be used in addition to a go-to-sleep signal. According this aspect, the method may further comprise the step of: responsive to determining that there is no paging message for said radio device during a subsequent DRX cycle, sending a go-to-sleep signal to said radio device for notifying said radio device that there will be no paging record sent during the subsequent DRX cycle and that said radio device may go to sleep mode. The go-to-sleep signal may be sent over a physical downlink control channel monitored by said radio device during the DRX cycle.

In other words, the go-to-sleep signal, which may be a single bit signal, would be transmitted only when there is not any paging for the radio device; if there is, the go-to-sleep signal will not be sent and instead the power control signal is sent including the identifier so that false paging is avoided or at least reduced.

The method may be performed by, or by means of, the network node. The network node may be any device configured for radio communication with the radio device over a communication link, wherein the network node uses paging for network-initiated connection setup and/or transmits DCI to the radio device using the PDCCH, e.g. the NPDCCH or MPDCCH, which holds the DCI pointing out the PDSCH transmission holding the paging message.

The network node may be embodied by a base station, an eNodeB in LTE, a gNodeB in New Radio (NR) or a relay node or any station defined above in the context of the method aspect according to the first general aspect.

The technique may be embodied in a communication network compatible with at least one of 3GPP Long Term Evolution (LTE), LTE-Advanced (e.g., 3GPP LTE Release 10, LTE Advanced Pro (e.g. 3GPP LTE Release 13), 3GPP New Radio (NR) for the 5th Generation (5G), 3GPP Releases 13, 14 and 15 (RAN2), and 3GPP TS 36.304.

According to a second general aspect, there is provided a method of receiving, by a radio device, a power control signal in a radio communication between a network node and the radio device. Preferably, the method may be a method of sending the power control signal according to a DRX cycle or paging cycle in a radio communication between a network node and a radio device.

The method comprises or triggers a step of receiving the power control signal, wherein the power control signal includes an indicator that, according to a scheme, uniquely identifies a radio device which is being paged within a group of radio devices sharing at least the same PF.

It is noted that the radio device that is receiving the power control signal may not be the radio device which is being paged, in particular if multiple radio devices share the same PF and/or PO. However, the radio device that is receiving the power control signal comprising the indicator may determine based on the indicator whether or not said radio device is the one that is being paged.

Embodiments of the method according to the second general aspect may include one or more of the following aspects and/or features.

According to one aspect, the indicator may uniquely identify according to the scheme the radio device which is being paged within a group of radio devices sharing the same PF and the same PO(s).

According to a further aspect, the indicator, according to the scheme, may uniquely identify the radio device which is being paged only within a group of radio devices sharing the same PF or sharing the same PF and the same PO(s).

According to a further aspect, the indicator may be provided according to the scheme as a binary sequence and/or may be derived from a radio device identity, UE_ID, used for paging of the radio device. The indicator may comprise the most significant bit of the UE_ID and does not comprise the least significant bit of the UE_ID.

The method according to the second general aspect may further comprise the step of determining, based on the received indicator and according to the scheme, whether or not the indicator identifies the radio device that is receiving the power control signal as the radio device which is being paged. According to this aspect, any of the radio device within a group of radio devices sharing at least the same PF can determine based on the received indicator whether or not said radio device is currently being paged.

According to variant of this aspect, the method according to the second general aspect may further comprises the step of: responsive to determining the radio device that is receiving the power control signal being identified as the radio device which is being paged, decoding the PDCCH which holds the DCI pointing out the PDSCH transmission holding the paging message.

According to this variant, the method further comprises the step of: responsive to determining the radio device that is receiving the power control signal not being identified as the radio device which being paged, going back to sleep mode (RRC_Idle state) without decoding the PDCCH, which holds the DCI pointing out the PDSCH transmission holding the paging message.

According to these variants, only one of the radio devices within the device group that shares at least the same paging frame stays awake and continues to decode the corresponding PDCCH, e.g. the NPDCCH or MPDCCH, which holds the DCI pointing out the (N)PDSCH transmission holding the paging message, namely the radio device that has been identified by the indicator. All the other radio device can go back to sleep mode in order to save power.

The PDCCH may be a Narrowband PDCCH, also referred to as NPDCCH or a Machine-type communication, MTC, PDCCH, also referred to as MPDCCH.

According to a further aspect, the step of determining, based on the received indicator and according to the scheme, whether or not the indicator identifies the radio device that is receiving the power control signal as the radio device which is being paged, may further comprise the following steps:

A first step of determining a reference indicator according to the scheme based on the identity used for paging of the radio device that has received the power control signal. A second step of comparing the determined reference indicator with the indicator received with the power control signal. And a third step of determining whether the indicator identifies the radio device that has received the power control signal as the radio device which is being paged. This is the case if the indicator equals the determined reference indicator. This is not the case if the indicator does not equal the determined reference indicator. The identity of the radio device may be derived from the IMSI.

According to this aspect, the reference indicator is determined according to the same scheme as the indicator received from the network node. The receiving radio device uses its own identity used for paging for determining the reference indicator. If said radio device is the one currently being paged by the network node, then the network node would have used also the same radio device identity for determining the indicator according to the scheme. In this case, the values of indicator and reference indicator would be identical. If said radio device is not the one currently being paged by the network node, then the network node would have used the identity of a different radio device within the device group for determining the indicator. The values of indicator and reference indicator would be different.

According to a further aspect, the reference indicator may be determined according to the scheme based on the International Mobile Subscriber Identity, IMSI, the number of paging frames within the radio device DRX cycle, and the number of paging occasions used within a paging frame. The resulting value may be represented as a binary sequence in the power control signal.

According to a further aspect, the reference indicator may be determined according to the scheme as a binary sequence by the formula:

$$\text{indicator}=\text{floor}\,(UE\_ID/(N*Ns)),$$

wherein floor ( ) is a floor function, UE_ID is the radio device identity of the radio device that is receiving the power control signal, N is the number of PFs within the radio device DRX cycle, and Ns is the number of POs used within a PF.

According to a further aspect, the reference indicator may be determined according to the scheme on the International Mobile Subscriber Identity, IMSI, the number of paging frames within the radio device DRX cycle, the number of paging occasions used within a paging frame, and based on the number of paging narrowbands or paging carriers provided in System Information. The resulting value may be represented as a binary sequence in the power control signal.

According to a further aspect, the reference indicator is determined according to the scheme as a binary sequence by the formula:

$$\text{indicator}=\text{floor}\,(\text{floor}\,(UE\_ID/(N*Ns))/Nn),$$

wherein floor ( ) is a floor function, UE_ID is the radio device identity used for paging of the radio device that has received the power control signal, N is the number of PFs within the radio device DRX cycle, Ns is the number of POs used within a PF and, and Nn is the number of paging narrowbands or paging carriers.

According to a further aspect, the received power control signal may be a wake-up signal, the method further comprising the step of: responsive to determining that no wake-up signal has been sent according to the DRX cycle, going back to sleep mode. Thus, according to this embodiment, the power control signal serves as a wake-up signal for the radio device that is being paged. If no wake-up signal is received or if the indicator does not match, the radio device goes back to sleep mode.

According to another aspect, the method may further comprise the step of receiving, by the radio device, a go-to-sleep signal indicating to said radio device that there will be no paging record sent during the subsequent DRX cycle, and responsive to receiving the go-to-sleep signal, going to sleep mode. Thus, in addition to the power control signal, the radio device may also receive a go-to-sleep signal over the same PDCCH used for paging. The go-to-sleep signal may be a single-bit signal, i.e. comprising no indicator in contrast to the power control signal.

The method may be performed by, or by means of, a radio device. The radio device may be embodied by a user equipment (UE), a machine-type device, a terminal or any station defined above in the context of the method aspect according to the second general aspect. The radio device may be a UE according to the 3GPP specification. The radio device may be embodied by any device configured for radio communication with the network node over a communication link, wherein the radio device is configured to wake up according to a DRX cycle or paging cycle. The radio device may be embodied by any device configured for radio communication using radio access technologies, in particular where a power control signal is used. The radio device may be embodied by a UE according to the new UE categories (Cat-M1, Cat-M2), supporting reduced bandwidth of 6 physical resource blocks (PRBs) (up to 24 PRBs for Cat-M2), The radio device may be embodied by a Narrowband IoT (NB-IoT) UE providing a new radio interface (and UE categories, Cat-NB1 and Cat-NB2), in particular according to the LTE enhancements introduced in 3GPP Release 13, 14 and 15.

The method according to the second general aspect may further comprise any feature and aspects and/or achieve any advantage disclosed in the context of the method according to the first general aspect and/or may comprise one or more steps corresponding to any of the steps of the method according to the first general aspect.

According to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g. via the radio network and/or via the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for sending a power control signal, preferably according to a discontinuous reception (DRX) cycle, in a radio communication between the device and a radio device is provided. The device is configured to perform or trigger the steps of the method according to the first general aspect.

Alternatively or in addition, the device may comprise a sending unit for sending, to the radio device, the power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same paging frame.

As to another device aspect, a device for receiving a power control signal, preferably according to a DRX cycle, in a radio communication between a network node and the radio device is provided. The device may be configured to perform the method according to the second general aspect. Alternatively or in addition, the device comprises a receiving unit for receiving, from the network node, the power control signal, wherein the power control signal includes an indicator that, according to a scheme, uniquely identifies a radio device which is being paged within a group of radio devices sharing at least the same PF.

As to a further device aspect, a device for sending a power control signal, preferably according to a DRX cycle in a radio communication between the device and a radio device is provided. The device comprises a processor and a memory, said memory containing instructions executable by said processor whereby the device is operative to send, to the radio device, the power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same PF.

As to a further device aspect, a device for receiving a power control signal, preferably according to a DRX cycle, in a radio communication between a network node and the radio device is provided. The device comprises a processor and a memory, said memory containing instructions executable by said processor whereby the device is operative to receive, from the network node, the power control signal, wherein the power control signal includes an indicator that, according to a scheme, uniquely identifies a radio device which is being paged within a group of radio devices sharing at least the same PF.

As to a further aspect, a device for sending a power control signal, preferably according to a DRX, cycle, in a radio communication between the device and a radio device is provided. The device may comprise one or more modules for performing the method according to the first general aspect. Alternatively or in addition, the device comprises a sending module for sending, to the radio device, the power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same PF.

As to a further aspect, a device for receiving a power control signal, preferably according to a DRX, cycle, in a radio communication between a network node and the radio device is provided. The device may comprise one or more modules for performing the method according to the second general aspect. Alternatively or in addition, the device comprises a receiving module for receiving, from the network node, the power control signal, wherein the power control signal includes an indicator that, according to a scheme, uniquely identifies a radio device which is being paged within a group of radio devices sharing at least the same PF.

The devices and/or the stations may further include any feature disclosed in the context of the method aspects. Particularly, any one of the units and modules, or a further unit or module, may be configured to perform or initiate one or more of the steps of any one of the method aspects.

According to yet another aspect, a system for sending and receiving a power control signal, preferably according to a DRX cycle, in a radio communication between a network node and a radio device is provided. The system comprises a device for sending a power control signal, preferably according to a DRX cycle as described in this document and at least one device for receiving a power control signal, preferably according to a DRX cycle, as described in this document.

Some of the advantages achieved by the methods and the corresponding radio network nodes and radio devices may be compiled as enabling a reduced power consumptions of radio devices operative for idle mode paging.

BRIEF DESCRIPTION OF THE DRAWINGS

Further details of embodiments of the technique are described with reference to the enclosed drawings, wherein.

DETAILED DESCRIPTION

Reference now should be made to the drawings, in which the same reference numerals are used throughout the different drawings to designate the same or similar components.

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details.

While terminologies from LTE enhancement introduced in 3GPP Releases 13, 14, and 15, referred to as eMTC, as well as terminologies from Narrowband IoT (NB IoT) have been used to exemplify a possible implementation, this should not be seen as limiting the scope of the invention to only the aforementioned systems. Other radio access technologies may also benefit from exploiting the ideas covered within this disclosure. Moreover, while the following embodiments are primarily described for Radio access network compatible with 3GPP Release 15, it is readily apparent that the technique described herein may also be implemented in any other radio network, including Long Term Evolution (LTE) or a successor thereof.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general-purpose computer, e.g. including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

The following embodiments are not mutually exclusive. Components from one embodiment may be tacitly assumed to be present in another embodiment and it will be obvious to a person skilled in the art how those components may be used in the other exemplary embodiments.

Figure 1:
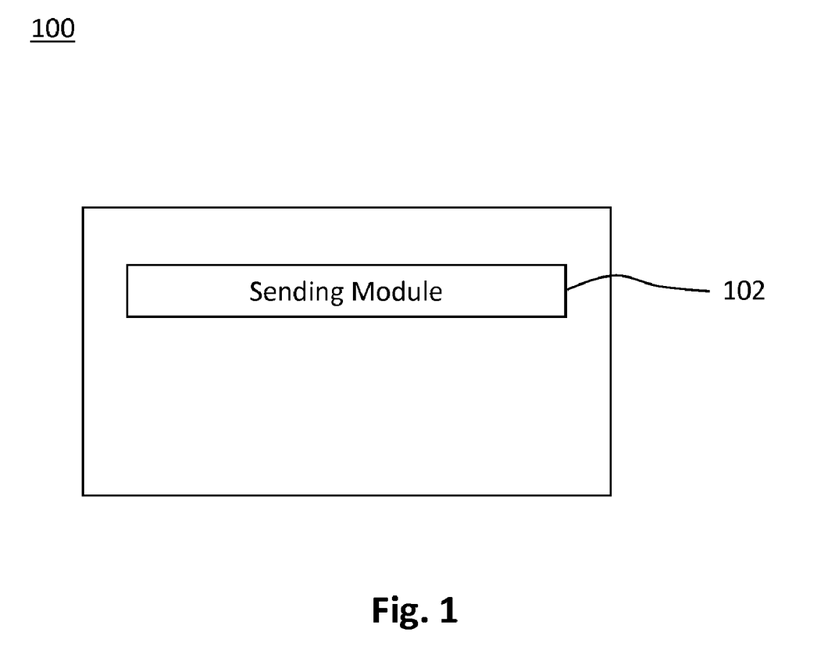
FIG. 1 shows a schematic block diagram of a device for sending a power control signal in a radio communication between the device and a radio device.
Figure 2:
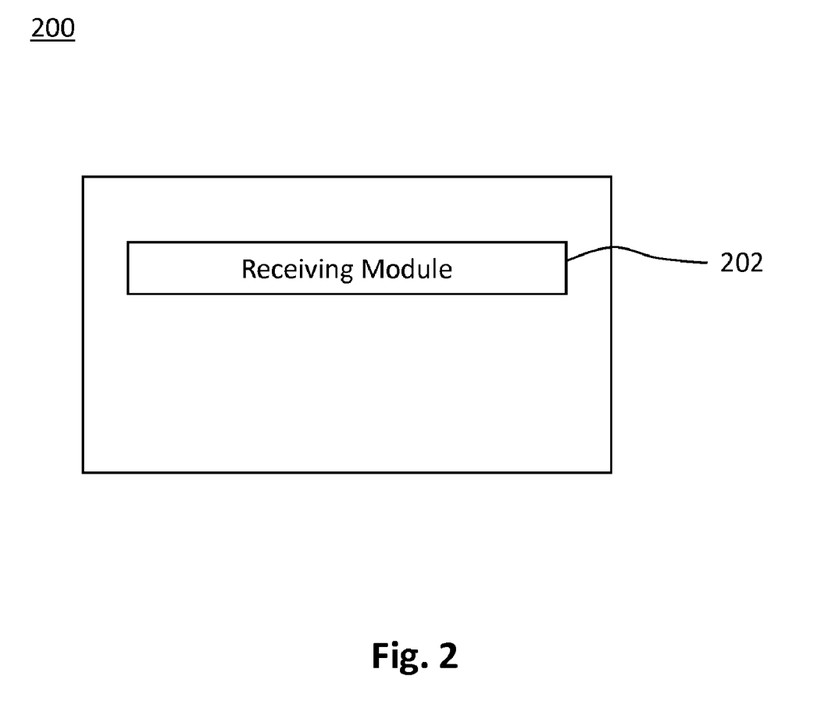
FIG. 2 shows a schematic block diagram of a device for receiving a power control signal in a radio communication between a network node and the device.

FIG. 1 shows a schematic block diagram of a device 100 for sending a power control signal according to a DRX cycle in a radio communication between the device 100 and a radio device 200, as shown in FIG. 2. The device 100 comprises a sending module 102 for sending, to the radio device 200, the power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same paging frame.

to The device 100 may be connected to and/or part of a radio network, preferably a 5G NR network. The device 100 may be any network node or device configured for radio communication with the radio device over a communication link. The device 100 is configured to use paging for network-initiated connection setup and/or transmits DCI to the radio device using the PDCCH, e.g. the NPDCCH or MPDCCH, which holds the downlink control information pointing out the PDSCH transmission holding the paging message.

The network node or device 100 may be embodied by a network node supporting MPDCCH in eMTC or NPDCCH in NB-IoT or any eNodeB, station or network node defined above in the context of the method aspect according to the first general aspect.

FIG. 2 shows a schematic block diagram of a device 200 for receiving a power control signal according to a DRX cycle in a radio communication between a network node 100 and the device 200. The device 200 comprises a receiving module 202 for receiving, from the network node 100, the power control signal. The power control signal includes an indicator that, according to a scheme, uniquely identifies a radio device which is being paged within a group of radio devices sharing at least the same paging frame.

The device 200 may be any device configured for radio communication with the network node over a communication link, wherein the radio device is configured to wake up according to a discontinuous reception, DRX, cycle or paging cycle.

The radio device may be embodied by a user equipment (UE), a machine type device, a terminal or any station defined above in the context of the method aspect according to the second general aspect. The radio device may be a UE according to the 3GPP specification. The radio device may be embodied by any device configured for radio communication with the network node over a communication link. The radio device may be embodied by any device configured for radio communication using radio access technologies, in particular where a power control signal is used. The radio device may be embodied by a UE according to the new UE categories (Cat-M1, Cat-M2), supporting reduced bandwidth of 6 physical resource blocks (PRBs) (up to 24 PRBs for Cat-M2), The radio device may be embodied by a Narrowband IoT (NB-IoT) UE providing a new radio interface (and UE categories, Cat-NB1 and Cat-NB2), in particular according to the LTE enhancements introduced in 3GPP Release 13, 14 and 15.

Any of the modules of the device 100 and the device 200 may be implemented by units configured to provide the corresponding functionality.

Figure 3:
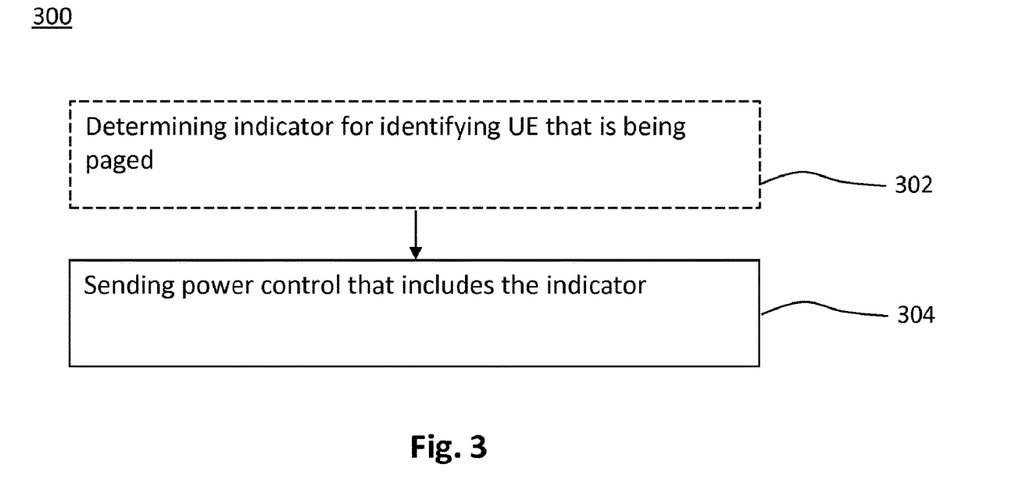
FIG. 3 shows a flowchart for a method of sending a power control signal in a radio communication between a network node and a radio, which is implementable by the device of FIG. 1.

FIG. 3 shows a flowchart for a method of sending, by a network node, a power control signal according to a DRX cycle in a radio communication between a network node and a radio device. The method 300 comprises a step of sending 302 to the radio device, a power control signal for notifying a radio device which is being paged, wherein the power control signal includes an indicator that, according to a scheme, uniquely identifies a subgroup of one or more radio devices comprising at least the radio device that is being paged within a group of radio devices sharing at least the same paging frame.

Optionally, the method may further comprise a step of determining an indicator based pm the scheme for identifying the radio device that is being paged. This will be described in more detail below.

The method 300 may be performed by the device 100. For example, the module 102 may perform the step 304. Optionally, the device 100 may have a determination module (not shown) for computing the indicator in order to perform the step 302.

Figure 4:
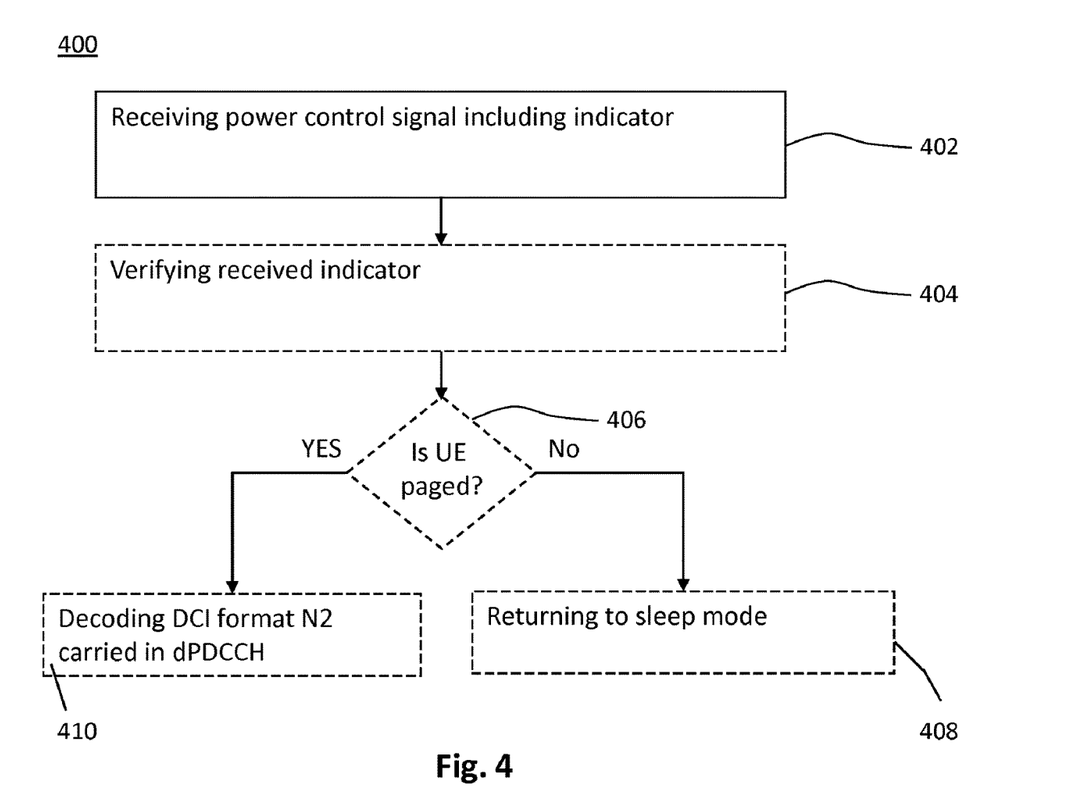
FIG. 4 shows a flowchart for a method of receiving a power control signal in a radio communication between a network node and a radio device, which is implementable by the device of FIG. 2.

FIG. 4 shows a flowchart for a method of receiving, by a radio device, a power control signal according to a DRX cycle in a radio communication between a network node and the radio device.

The method 400 comprises a step of receiving 402, from the network node, the power control signal including the indicator. As noted above, the indicator, according to a scheme, uniquely identifies a radio device which is being paged within a group of radio devices sharing at least the same paging frame.

Optionally, the method 400 further comprises a steps of verifying 404 the received indicator and determining 406, whether or not the indicator identifies this particular radio device as the one that is currently being paged. These steps comprise determining, based on the received indicator and according to the scheme, whether or not the indicator identifies the radio device that is receiving the power control signal as the radio device which is being paged. As noted above, all radio device sharing the same PF and/or PO may receive the power control signal, whereas only one of these radio devices is currently being paged. Accordingly, based on the same scheme that was used to compute the indicator, the radio device that has received the indicator with the power control signal can now determine in step 404 and subsequently in step 406, whether or not the indicator identifies this particular radio device as the one that is currently being paged or not.

Optionally, the method 400 further comprises steps 408 and 410.

According to step 408, responsive to determining in step 406 that the radio device not being identified as the radio device which being paged, the radio device returns to sleep mode without decoding the PDCCH which holds the DCI pointing out the PDSCH transmission holding the paging message.

According to step 410, responsive to determining in step 406 that the radio device being identified as the radio device which being paged, the radio device continues to decode the PDCCH which holds the DCI pointing out the PDSCH transmission holding the paging message.

As noted above, NPDCCH or MPDCCH may be used as the PDCCH.

Figure 5:
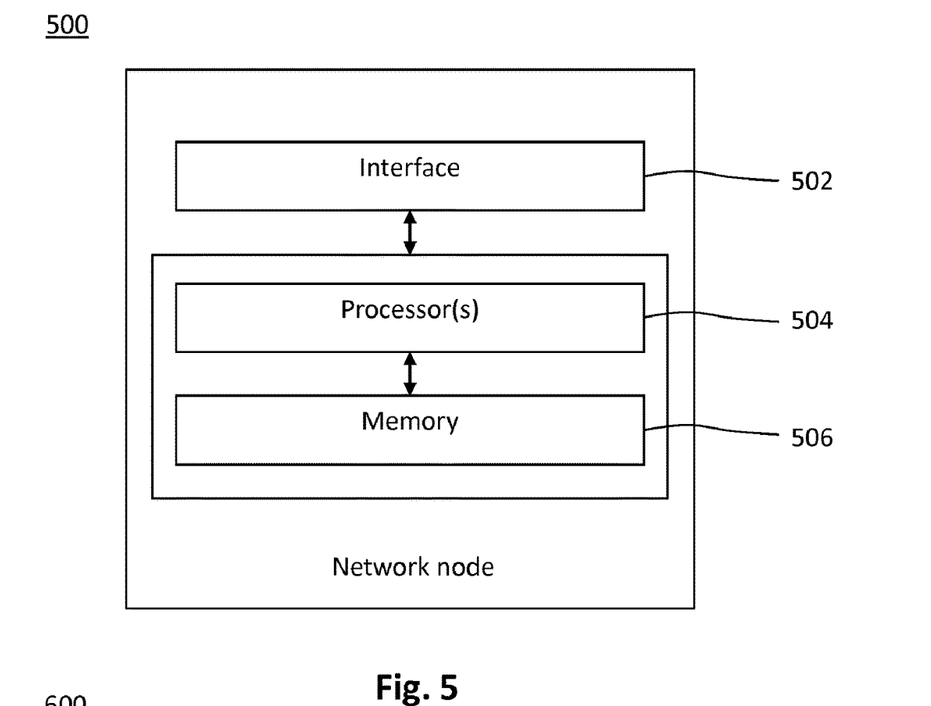
FIG. 5 shows a schematic block diagram of an embodiment of a device for performing the method of FIG. 3.

FIG. 5 shows a schematic block diagram for an embodiment of a device 500 for sending a power control signal according to a DRX cycle in a radio communication between the device 500 and a radio device. The device 500 (network node) may comprises a radio interface 502 for radio communication with at least a radio device 600 that is configure to receive the power control signal, one or more processor circuits 504 for performing the method 300 and memory 506 coupled to the processor circuits 504. The memory 506 is encoded with instructions that implement the module 102.

The one or more processor circuits 504 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 506, station functionality. For example, the one or more processor circuits 504 may execute instructions stored in the memory 506. Such functionality may include providing various features and steps discussed herein, including any of the benefits disclosed herein.

Figure 6:
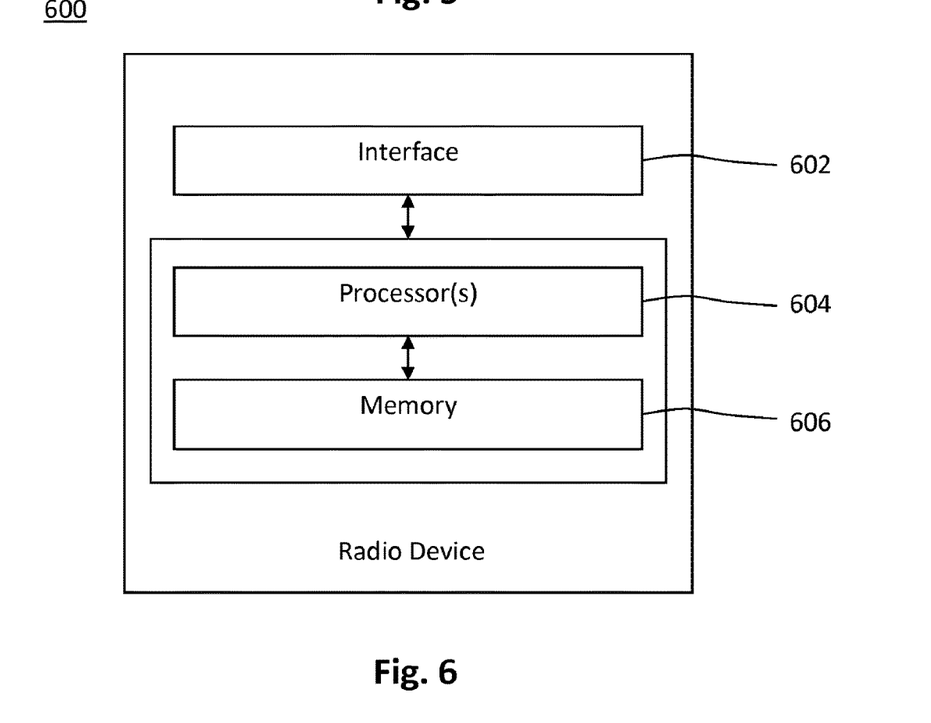
FIG. 6 shows a schematic block diagram of an embodiment of a device for performing the method of FIG. 4.

FIG. 6 shows a schematic block diagram for an embodiment of a device 600 for receiving a power control signal according to a DRX cycle in a radio communication between a network node 500 and the device 600.

The second device 600 comprises a radio interface 602 for radio communication with at least the network node (device 500), one or more processor circuits 604 for performing the method 400 and memory 606 coupled to the processor circuits 604. The memory 606 is encoded with instructions to implement the modules 202.

The one or more processor circuits 604 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 606, station functionality. For example, the one or more processor circuits 604 may execute instructions stored in the memory 606. Such functionality may include providing various features and steps discussed herein, including any of the benefits disclosed herein.

Figure 7:
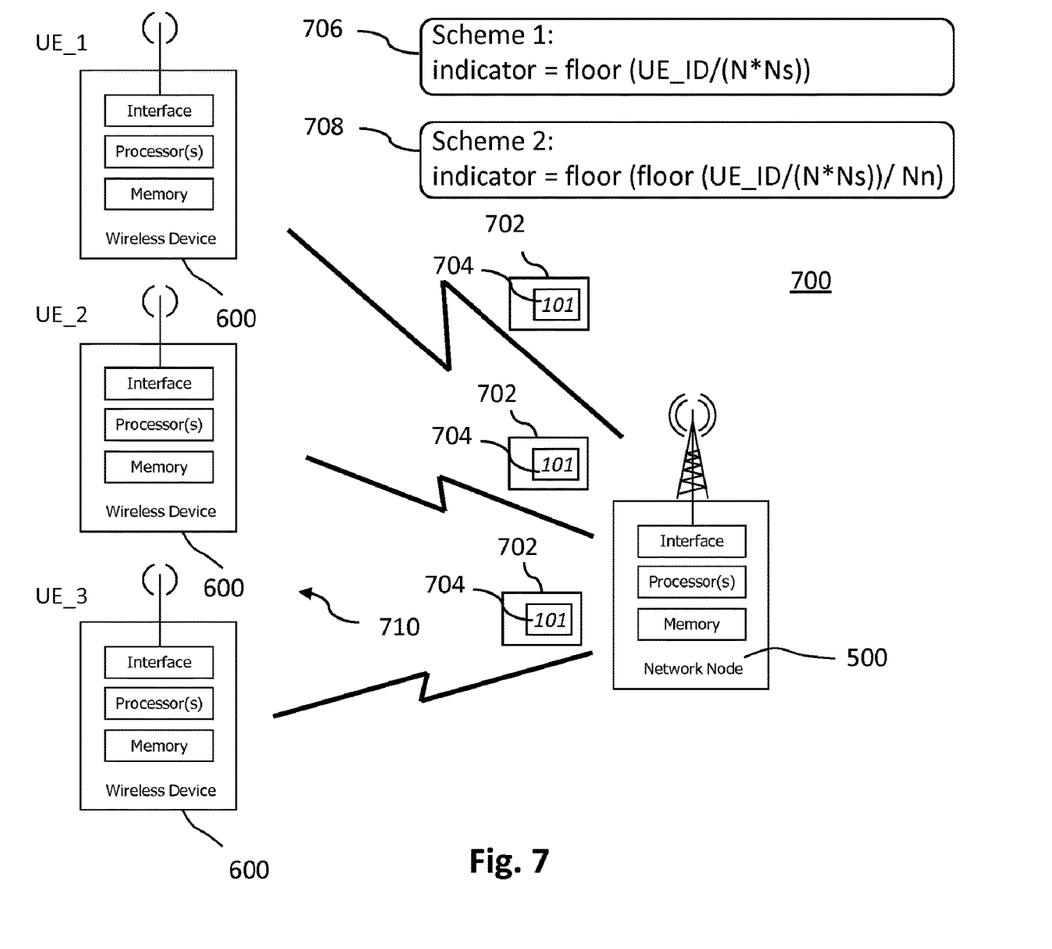
FIG. 7 illustrates an example of an embodiment of a system for performing the method of FIGS. 3 and 4.

FIG. 7 illustrates an exemplary communication system 700 for sending and receiving a power control signal in a radio communication between a network node 500 and one or more radio devices 600, wherein embodiments herein may be employed or applied.

The system 700 comprises a network node 500, configured to send a power control signal 702 in order to page a respective radio device. The system 700 further comprises multiple radio devices 600, hereinafter referred to as UEs 600 configured to receive the power control signal according to the DRX cycle.

As noted above, paging is used for network initiated connection setup. UEs in RRC Idle mode use a DRX cycle also known as paging cycle to reduce power consumption. This DRX cycle determines how frequently UEs check for paging messages. The default DRX cycle is broadcast within System Information Block 2 (SIB 2).

The network node 500 is configured, as explained in connection with FIG. 10, to send a power control signal 702 to indicate that there will be one or more paging records sent during the (e) DRX cycle that follows. The power control signal 702 is received by a group 710 of UEs 600. In contrast to the known approach as described in FIG. 10, the power control signal 702 according to the embodiment now includes an indicator 704. The indicator, according to a scheme 706 or 708, uniquely identifies a subgroup of one or more radio devices comprising at least the radio device that is being paged within a group 710 of radio devices 600 that all receive the same power control signal 702.

The schemes 706 und 706 used for determining the indicator 704 will be described in more detail below. First, the problem of false paging will be described in more detail based on the usage of a wake-up signal as known in the art.

As mentioned earlier, the radio frame in which a UE wakes up is called a paging frame (PF). Within the radio frame, UEs do not remain awake in all sub frames. Instead, an UE wakes up in a specific subframe within a radio frame. These specific subframes within a Paging Frame when UE wakes up are referred to as paging occasions (POs). There may be only one PO within a PF.

Paging for a UE is specified in the technical specification 3GPP TS 36.304, V14.3.0, cf. sections 7.1 and 7.2). According to this specification:

PF is given by the following equation: $PF=SFN \bmod T = (T \text{ div } N)*(UE\_ID \bmod N)$.

The formula to compute PO is extracted from a look-up table (subframe pattern defined in 7.2 of this specification) which is indexed using: i_s and Ns. Index i_s pointing to PO will be derived from following calculation:

$i\_s = \text{floor}(UE\_ID/N) \bmod Ns$. Ns is computed as $Ns = \text{Max}(1, nB/T)$.

Once Ns and i_s values are computed, UE makes a use of the look up table. The intersection of i_s and Ns values in the look up table shows in which subframe(s) UE will wake up.

The UE identity, UE_ID, is determined as follows:
UE_ID:
IMSI mod 1024, if P-RNTI is monitored on PDCCH.
IMSI mod 4096, if P-RNTI is monitored on NPDCCH.
IMSI mod 16384, if P-RNTI is monitored on MPDCCH or if P-RNTI is monitored on NPDCCH and the UE supports paging on a non-anchor carrier, and if paging configuration for non-anchor carrier is provided in System Information.

IMSI is given as sequence of digits of type Integer (0 . . . 9), IMSI shall in the formulae above be interpreted as a decimal integer number, where the first digit given in the sequence represents the highest order digit. For example: IMSI=12 (digit1=1, digit2=2).

In the calculations, this shall be interpreted as the decimal integer "12", not "1×16+2=18". That is, if the a wake-up signal is common to all UEs sharing a PF, there will be false paging for all UEs for which 'UE_ID mod N' is the same.

By way of example only, it is assumed that the three UEs 600 labelled as UE_1, UE_2 and UE_3 in FIG. 7 share the same PF and PO. By way of example only, it is assumed that the value for the UE_ID is as follows: UE_ID of UE_1=2, UE_ID of UE_2=1538 and UE_ID of UE_3 is 1026.

According to this example, all UEs have UE_ID mod N=2 with N=512 and would therefore have the same PF. Assuming that the UEs also share the same PO, e.g. assuming that Ns=1 for all UEs, all UEs shown in FIG. 7 would receive the same signal.

It is therefore proposed to include more bits of information in the power control signal 702, i.e. the indicator 704, which can differentiate between UEs that share the same PF and the same PO. For example, floor(UE_ID/(N*Ns)) is equal to 0, 3, and 2 for these cases and could be used to separate these UEs and avoid false paging.

Thus, in one embodiment and according to a first scheme 706, these bits that are added as the indicator 704 to the power control signal would be the significant bits after the 'UE_ID mod N' that is the following:

Indicator=floor(UE_ID/$N*Ns$).    (Formula 1):

According to another embodiment, a another scheme 708 is used to compute the indicator 704. The bits of the indicator according to Formula 1 are currently used for separating UEs to different paging carriers in NB-IoT and different paging narrowbands in eMTC. Accordingly, there will be no false paging between UEs on different paging carriers or narrowbands since a UE only monitors paging on one carrier or narrowband. This is specified for eMTC by the following text in TS 36.304:

"If P-RNTI is monitored on MPDCCH, the PNB is determined by the following equation: PNB=floor(UE_ID/(N*Ns)) mod Nn."

Therefore, in case multiple narrowbands are used, it would be sufficient to differentiate the UEs in the power control signal that share both PF (and PO) and paging narrowband (PNB). In this case, it is proposed to use a second scheme 708 defined by Formula 2 in order to determine the indicator 704 to be added to the power control signal 702.

Indicator==floor(floor(UE_ID/($N*Ns$))/$Nn$).    (Formula 2):

Nn corresponds to the number of paging narrowbands.

It is noted that in the worst configuration and worst parameter setting for N, nB, T, Ns, Nn, there would not be enough bits in IMSI to sufficiently differentiate UEs over both narrowbands and WUS-signals. In this case, the proposed approach could not be applied. However in practice having Nn set to the max value, i.e. to maxAvailNarrowBands-r13=16 in TS 36.331, such a situation should be very rare such that this is not expected to be a practical problem. Expressed differently, if the maximum of 16 narrowbands are configured for paging, false paging is already avoided by putting UEs on different narrowbands and therefore the proposed power control signal differentiation signal as proposed here may be used as a complementary technique which can minimize false paging when less narrowbands are being used.

For NB-IoT, the principle is exactly the same. Also in this case, the indicator value can be computed based on Formula 2, wherein in this case Nn in Formula 2 corresponds to the number of paging carriers (for P-RNTI monitored on NPDCCH) provided in System Information instead to the number of paging narrowbands.

If P-RNTI is monitored on NPDCCH and the UE supports paging on a non-anchor carrier, and if paging configuration for non-anchor carrier is provided in System Information, then the paging carrier is determined by the paging carrier with smallest index n (0≤n≤Nn−1) fulfilling the following equation:

floor(UE_ID/($N*Ns$))   mod   $W < W(0) + W(1) + \ldots + W(n)$.

The parameters/value used in Formula 1 and Formula 2 are determined, according to the technical specification 3GPP TS 36.304, section 7.1, as follows:

UE_ID is determined as IMSI mod X*1024, X being one of 1, 2, 4 and 16,

N=min(T, nB), wherein "T" is radio device DRX cycle length in radio frames, and, "nB" is one of 4T, 2T, 1T, ¼T, ¼T, ⅛T, $\frac{1}{16}$T, $\frac{1}{32}$T, $\frac{1}{64}$T, $\frac{1}{128}$T, $\frac{1}{256}$T, T/512, and T/1024.

Ns: max (1, nB/T);

Nn: number of paging narrowbands (for P-RNTI monitored on MPDCCH) or paging carriers (for P-RNTI monitored on NPDCCH) provided in System Information). P-RNTI is the abbreviation for Paging-RNTI or Paging Radio-network temporary identifier.

Thus, notwithstanding whether the indicator 704 that to be added to the power control signal during a paging cycle according to scheme 706 or scheme 708, the network node 500 will first determine if there is a paging message for any of the radio devices during a subsequent DRX cycle. If so, the network node 500 will first determine the indicator value for the respective radio device that should be paged by computing the indicator value according to formula 1 or according to formula 2, wherein the particular UE_ID of the respective radio device that should be paged is used. Thus, the bit sequence of the indicator 704 that is added to the power control signal 702 will depend on which one of the UEs shown in FIG. 7 is currently paged.

Then, the network node 500 will send the power control signal 702 according to the paging cycle prior to sending the downlink assignment for paging using the PDCCH and prior to sending the paging message using the PDSCH.

In the present example, all three UEs, as UE_1, UE_2 and UE_3, will receive the power control signal 702 including the indicator 704.

Each of the UEs is configured to determine, based on the received indicator 704 and according to the scheme, whether or not the indicator identifies the radio device that is receiving the power control signal as the radio device which is being paged. By way of example, each of the UEs is configured to determine a reference indicator using the same scheme/formula as the network node, e.g. using Formula 1 or Formula 2. The receiving radio device uses its own identity used for paging for determining the value for UE_ID as used in the scheme. The other parameters, e.g. N, Ns, Nn have the same values for all UEs.

Thus, only one of the UEs will compute a reference indicator having the same value as the received indicator. This UE is therefore the one that is currently being paged by the network node 500. Thus, this UE will stay up and continue decoding the PDCCH which holds the downlink control information pointing out the PDSCH transmission holding the paging message. All other UEs will go back to sleep mode without decoding the NPDCCH/MPDCCH which holds the downlink control information pointing out the (N)PDSCH transmission and without reading the paging message. False paging is thus avoided or at least reduced.

The power control signal may be used as a wake-up signal. Alternatively, the power control signal may be used in addition to a go-to-sleep signal. Such a go-to-sleep signal would be transmitted over the same physical channel but only when there is not any paging for the radio device.

Figure 8:
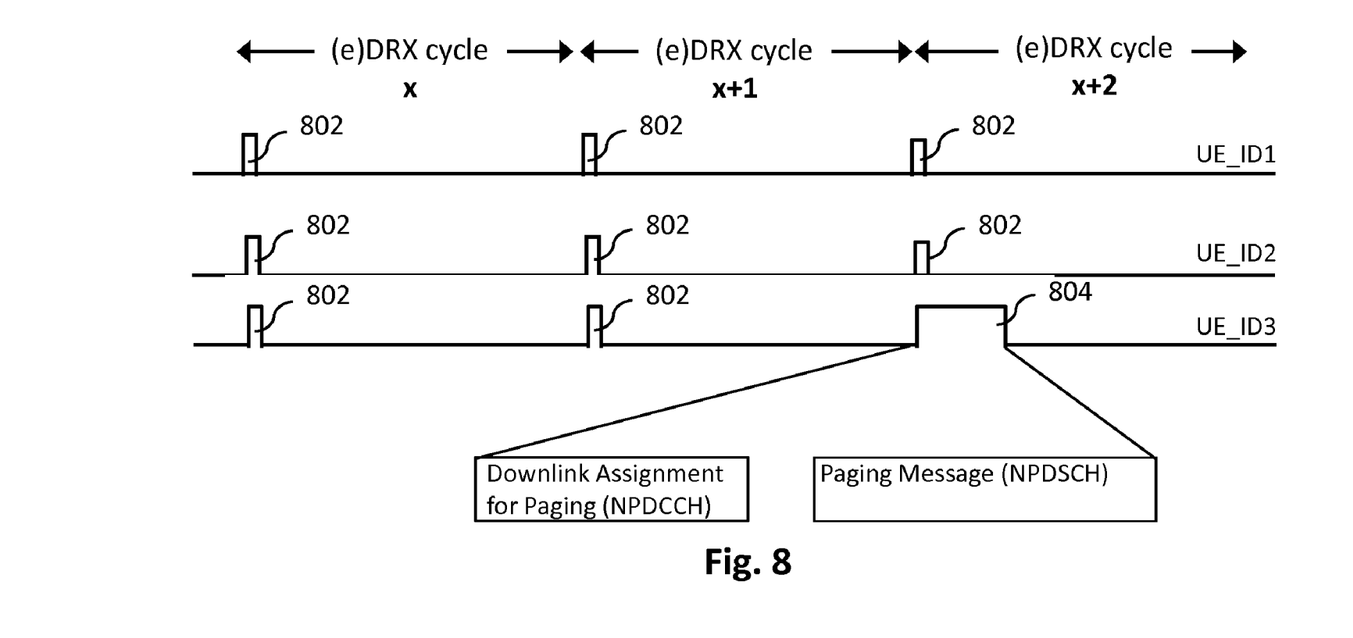
FIG. 8 illustrates an example of UE idle mode operation of UEs performing the method of FIG. 4.

FIG. 8 illustrates an example of UE idle mode operation of the three UE as described in FIG. 7.

In every paging cycle ((e)DRC cycle), the UEs 500 sharing the same PF and PO wake up in the same designated time window to check whether there is a power control signal 702 sent from the network node 500. This UE activity is illustrated with the reference numeral 802.

The power control signal is used to indicate that there will be one or more paging records sent during the (e)DRX cycle that follows. If an UE determines that there was not power control signal, the UE would go back to sleep. This is the case in the first two DRX (paging) cycles "x" and "x+1". However, in the third DRX cycle "x+2", a paging signal is received by all of the UEs. Each of the UEs determines, based on the received indicator included in the power control signal, whether or not the indicator matched the UE's reference indicator. This is only the case for the UE the idle mode operation of which is illustrated with the lowest sub diagram in FIG. 8.

Only this UE will stay up and continue decoding the PDCCH which holds the DCI pointing out the PDSCH transmission holding the paging message and subsequently the paging message. The other two UE go back to sleep mode immediately after having determined that the indicator does not match their reference indicator.

As has become apparent from above description of exemplary embodiments, the technique can reduce control signaling. The technique can be embodied to distinguish between persistent and rapidly changing control parameters, and/or to distinguish between supported and unsupported control parameters.

Embodiments reduce an amount of radio resources needed for the transmission of downlink control information. For example, the amount of radio resources for control signaling are halved. Furthermore, e.g., at the same time, embodiments allow for more detailed control information.

Many advantages of the present invention will be fully understood from the foregoing description, and it will be apparent that various changes may be made in the form, construction and arrangement of the units and devices without departing from the scope of to the invention and/or without sacrificing all of its advantages. Since the invention can be varied in many ways, it will be recognized that the invention should be limited only by the scope of the following claims.

The invention claimed is:

1. A method of sending, by a network node, a power control signal according to a discontinuous reception (DRX) cycle in a radio communication between a network node and a radio device, the method comprising:
    determining that there is a paging message for a radio device during an upcoming discontinuous receive cycle;
    determining an indicator that, according to a scheme, uniquely identifies a subgroup of one or more radio devices comprising at least the radio device that is being paged within a group of radio devices sharing at least the same paging frame, wherein determining the indicator comprises either:
        determining the indicator according to the scheme by the formula indicator=floor (UE_ID/(N*Ns)), wherein floor ( ) is a floor function, UE_ID is the radio device identity, N is the number of paging frames within the radio device DRX cycle, and Ns is the number of paging occasions used within a paging frame; or
        determining the indicator according to the scheme and further based the number of paging narrowbands or paging carriers provided in system information, and wherein the indicator is determined according to the scheme by the formula indicator=floor (floor (UE_ID/(N*Ns))/Nn), wherein floor ( ) is a floor function, UE_ID is the radio device identity, N is the number of paging frames within the radio device DRX cycle, Ns is the number of paging occasions used within a paging frame, and Nn is the number of paging narrowbands or paging carriers; and
    sending the power control signal for notifying the radio device which is being paged, wherein the power control signal includes the indicator.

2. The method of claim 1, wherein the indicator, according to the scheme, uniquely identifies a subgroup of one or more radio devices comprising at least the radio device that is being paged within a group of radio devices sharing the same paging frame and the same paging occasion.

3. The method of claim 1, wherein the indicator, according to the scheme, uniquely identifies a subgroup of one or more radio devices comprising at least the radio device which is being paged only within a group of radio devices sharing the same paging frame or sharing the same paging frame and the same paging occasion.

4. The method of claim 1, wherein the indicator is provided according to the scheme as a binary sequence.

5. The method of claim 1, wherein the indicator comprises the most significant bit of a radio identifier (UE_ID) used to page the radio device and does not comprise the least significant bit of the UE_ID.

6. The method of claim 1, wherein the indicator is derived from:
    a radio device identity (UE_ID), used for paging the radio device and the DRX parameters provided in System Information.

7. The method of claim 1, wherein the indicator is determined according to the scheme by the formula:

indicator=floor (floor (UE_ID/(N*Ns)), wherein floor ( ) is a floor function, UE_ID is the radio device identity, N is the number of paging frames within the radio device DRX cycle, and Ns is the number of paging occasions used within a paging frame.

8. The method of claim 1, wherein the indicator is determined according to the scheme based further on the number of paging narrowbands or paging carriers provided in system information.

9. The method of claim 1, wherein the indicator is determined according to the scheme by the formula:

indicator=floor (floor (UE_ID/(N*Ns))/Nn), wherein floor ( ) is a floor function, UE_ID is the radio device identity, N is the number of paging frames within the radio device DRX cycle, Ns is the number of paging occasions used within a paging frame and, and Nn is the number of paging narrowbands or paging carriers.

10. The method of claim 1, further comprising:
responsive to determining that there is a paging message for the radio device during a subsequent DRX cycle, sending the power control signal for said radio device prior to sending the downlink assignment for paging said radio device using the physical downlink control channel (PDCCH) and prior to sending the paging message for said radio device using the physical downlink shared channel, PDSCH.

11. The method of claim 1, further comprising:
responsive to determining that there is no paging message for said radio device during a subsequent DRX cycle, sending a go-to-sleep signal to said radio device for notifying said radio device that there will be no paging record sent during the subsequent DRX cycle and that said radio device may go to sleep mode.

12. A method of receiving, by a radio device, a power control signal according to a discontinuous reception (DRX) cycle in a radio communication between a network node and the radio device, the method comprising:
receiving the power control signal, wherein the power control signal includes an indicator that, according to a scheme, uniquely identifies a subgroup of one or more radio devices comprising at least a radio device which is being paged within a group of radio devices sharing at least the same paging frame, wherein the indicator is:
either determined according to the scheme by the formula indicator=floor (UE_ID/(N*Ns)), wherein floor ( ) is a floor function, UE_ID is the radio device identity, N is the number of paging frames within the radio device DRX cycle, and Ns is the number of paging occasions used within a paging frame;
or determined according to the scheme and further based the number of paging narrowbands or paging carriers provided in system information, and wherein the indicator (704) is determined according to the scheme (708) by the formula indicator=floor (floor (UE_ID/(N*Ns))/Nn), wherein floor ( ) is a floor function, UE_ID is the radio device identity, N is the number of paging frames within the radio device DRX cycle, Ns is the number of paging occasions used within a paging frame, and Nn is the number of paging narrowbands or paging carriers; and
determining, based on the received indicator and according to the scheme, whether or not the indicator identifies the radio device that is receiving the power control signal as the radio device which is being paged.

13. The method of claim 12, wherein the indicator, according to the scheme, uniquely identifies a subgroup of one or more radio devices comprising at least the radio device which is being paged within a group of radio devices sharing the same paging frame and the same paging occasion.

14. The method of claim 12, wherein the indicator, according to the scheme, uniquely identifies a subgroup of one or more radio devices comprising at least the radio device which is being paged only within a group of radio devices sharing the same paging frame or sharing the same paging frame and the same paging occasion.

15. The method of claim 12, wherein the indicator comprises the most significant bit of a radio identifier (UE_ID) used to page the radio device and does not comprise the least significant bit of the UE_ID.

16. The method of claim 12, further comprising:
responsive to determining that the radio device that is receiving the power control signal is identified by the indicator as the radio device which is being paged, decoding the physical downlink control channel (PDCCH) which holds the downlink control information pointing out the physical downlink shared channel (PDSCH) transmission holding the paging message; and
responsive to determining that the radio device that is receiving the power control signal is not identified as the radio device which is being paged, going to sleep mode without decoding the PDCCH which holds the downlink control information pointing out the PDSCH transmission holding the paging message.

17. The method of claim 12, wherein determining, based on the received indicator and according to the scheme, whether or not the indicator identifies the radio device that is receiving the power control signal as the radio device which is being paged, further comprises:
determining a reference indicator according to the scheme, based on the identity used for paging of the radio device that has received the power control signal,
comparing the determined reference indicator with the indicator received with the power control signal, and
determining that the indicator identifies the radio device that has received the power control signal as the radio device which is being paged if the indicator equals the determined reference indicator; and
determining that the indicator does not identify the radio device that has received the power control signal as the radio device which is being paged if the indicator does not equal the determined reference indicator.

18. The method of claim 17, wherein the reference indicator is determined according to the scheme by the formula:

$$\text{indicator} = \text{floor} (\text{floor} (UE\_ID/(N*Ns)),$$

wherein floor ( ) is a floor function, UE_ID is the radio device identity of the radio device that is receiving the power control signal, N is the number of paging frames within the radio device DRX cycle, and Ns is the number of paging occasions used within a paging frame.

19. The method of claim 17, wherein the reference indicator is determined according to the scheme based further on the number of paging narrowbands or paging carriers provided in system information.

20. The method of claim 17, wherein the reference indicator is determined according to the scheme by the formula:

$$\text{indicator} = \text{floor} (\text{floor} (UE\_ID/(N*Ns))/Nn),$$

wherein floor ( ) is a floor function, UE_ID is the radio device identity used for paging of the radio device that has received the power control signal, N is the number of paging frames within the radio device DRX cycle, Ns is the number of paging occasions used within a paging frame and, and Nn is the number of paging narrowbands or paging carriers.

21. The method of claim 12, wherein the received power control signal is a wake-up signal, the method further comprising the step of:
responsive to determining that no wake-up signal has been sent according to the DRX cycle, going back to sleep mode.

22. The method of claim 12, further comprising
receiving, by the radio device, a go-to-sleep signal indicating to said radio device that there will be no paging record sent during the subsequent DRX cycle, and
responsive to receiving the go-to-sleep signal, going to sleep mode.

23. A device for sending a power control signal according to a discontinuous reception (DRX) cycle in a radio communication between the device and a radio device, the device comprising at least one processor and a memory, said memory comprising instructions executable by said at least one processor, whereby the device is operative to:
determine that there is a paging message for a radio device during an upcoming discontinuous receive cycle;
determine an indicator that, according to a scheme, uniquely identifies a subgroup of one or more radio devices comprising at least the radio device that is being paged within a group of radio devices sharing at least the same paging frame, wherein determine the indicator comprises either:

determine the indicator according to the scheme by the formula indicator=floor (UE_ID/(N*Ns)), wherein floor ( ) is a floor function, UE_ID is the radio device identity, N is the number of paging frames within the radio device DRX cycle, and Ns is the number of paging occasions used within a paging frame; or determine the indicator according to the scheme and further based the number of paging narrowbands or paging carriers provided in system information, and wherein the indicator is determined according to the scheme by the formula indicator=floor (floor (UE_ID/(N*Ns))/Nn), wherein floor ( ) is a floor function, UE_ID is the radio device identity, N is the number of paging frames within the radio device DRX cycle, Ns is the number of paging occasions used within a paging frame, and Nn is the number of paging narrowbands or paging carriers; and send the power control signal for notifying the radio device which is being paged, wherein the power control signal includes the indicator.

24. A device for receiving a power control signal according to a discontinuous reception (DRX) cycle in a radio communication between a network node and the device, the device comprising at least one processor and a memory, said memory comprising instructions executable by said at least one processor, whereby the device is operative to:

receive the power control signal, wherein the power control signal includes an indicator that, according to a scheme, uniquely identifies a subgroup of one or more radio devices comprising at least a radio device which is being paged within a group of radio devices sharing at least the same paging frame, wherein the indicator is:

either determined according to the scheme by the formula indicator=floor (UE_ID/(N*Ns)), wherein floor ( ) is a floor function, UE_ID is the radio device identity, N is the number of paging frames within the radio device DRX cycle, and Ns is the number of paging occasions used within a paging frame;

or determined according to the scheme and further based the number of paging narrowbands or paging carriers provided in system information, and wherein the indicator (704) is determined according to the scheme (708) by the formula indicator=floor (floor (UE_ID/(N*Ns))/Nn), wherein floor ( ) is a floor function, UE_ID is the radio device identity, N is the number of paging frames within the radio device DRX cycle, Ns is the number of paging occasions used within a paging frame, and Nn is the number of paging narrowbands or paging carriers; and determine, based on the received indicator and according to the scheme, whether or not the indicator identifies the radio device that is receiving the power control signal as the radio device which is being paged.

* * * * *

UNITED STATES PATENT AND TRADEMARK OFFICE
CERTIFICATE OF CORRECTION

PATENT NO. : 12,127,159 B2
APPLICATION NO. : 16/638159
DATED : October 22, 2024
INVENTOR(S) : Andreas Höglund It is certified that error appears in the above-identified patent and that said Letters Patent is hereby corrected as shown below:

In the Specification

In Column 4, Line 17, delete "life" and insert -- life is --, therefor.

In Column 6, Line 8, delete "by to" and insert -- by --, therefor.

In Column 6, Line 14, delete "and, and" and insert -- and, --, therefor.

In Column 6, Lines 42-43, delete "Information)." and insert -- Information. --, therefor.

In Column 6, Line 52, delete "power to" and insert -- power --, therefor.

In Column 7, Line 14, delete "According" and insert -- According to --, therefor.

In Column 7, Line 45, delete "(e.g.," and insert -- e.g., --, therefor.

In Column 8, Line 37, delete "which" and insert -- which is --, therefor.

In Column 9, Line 52, delete "and, and" and insert -- and, --, therefor.

In Column 13, Line 28, delete "to The device" and insert -- The device --, therefor.

In Column 14, Line 22, delete "pm" and insert -- on --, therefor.

In Column 14, Line 60, delete "device" and insert -- device is --, therefor.

In Column 14, Line 61, delete "which" and insert -- which is --, therefor.

In Column 14, Line 67, delete "which" and insert -- which is --, therefor.

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,127,159 B2

In Column 16, Line 15, delete "und" and insert -- and --, therefor.

In Column 16, Line 27, delete "7.2)." and insert -- 7.2. --, therefor.

In Column 16, Line 55, delete "the a" and insert -- the --, therefor.

In Column 17, Line 54, delete "to the" and insert -- of the --, therefor.

In Column 18, Lines 11-12, delete "Information)." and insert -- Information. --, therefor.

In Column 19, Line 3, delete "not" and insert -- no --, therefor.

In Column 19, Line 34, delete "scope of to" and insert -- scope of --, therefor.

In the Claims

In Column 20, Line 31, in Claim 7, delete "indicator = floor (floor (UE_ID/(N*Ns))," and insert -- indicator = floor (UE_ID/(N*Ns)), --, therefor.

In Column 20, Line 49, in Claim 9, delete "and, and" and insert -- and, --, therefor.

In Column 22, Line 18, in Claim 18, delete "indicator = floor (floor (UE_ID/(N*Ns))," and insert -- indicator = floor (UE_ID/(N*Ns)), --, therefor.

In Column 22, Line 40, in Claim 20, delete "and, and" and insert -- and, --, therefor.